(12) United States Patent
Baetzner et al.

(10) Patent No.: US 10,181,817 B2
(45) Date of Patent: Jan. 15, 2019

(54) TESTING DEVICE

(71) Applicant: PASAN SA, Neuchatel (CH)

(72) Inventors: Derk Baetzner, Ins (CH); Charles Clerc, Neuchatel (CH); Emanuel Neto, Yverdon les Bains (CH); Patrick Volluz, Colombier (CH); Pierre-Rene Beljean, Valangin (CH); Bas Albers, Waedenswil (CH); Pierre Papet, Hauterive (CH)

(73) Assignee: PASAN SA, Neuchatel (CH)

( * ) Notice: Subject to any disclaimer, the term of this patent is extended or adjusted under 35 U.S.C. 154(b) by 296 days.

(21) Appl. No.: 14/415,623

(22) PCT Filed: May 14, 2013

(86) PCT No.: PCT/IB2013/053918
§ 371 (c)(1),
(2) Date: Jan. 20, 2015

(87) PCT Pub. No.: WO2014/013350
PCT Pub. Date: Jan. 23, 2014

(65) Prior Publication Data
US 2015/0214890 A1 Jul. 30, 2015

(30) Foreign Application Priority Data
Jul. 20, 2012 (EP) .................................... 12177306

(51) Int. Cl.
*H02S 50/10* (2014.01)
(52) U.S. Cl.
CPC .................................... *H02S 50/10* (2014.12)
(58) Field of Classification Search
None
See application file for complete search history.

(56) References Cited

U.S. PATENT DOCUMENTS

2007/0068567 A1  3/2007 Rubin et al.
2009/0256581 A1  10/2009 Lu et al.
(Continued)

FOREIGN PATENT DOCUMENTS

CN   102023235 A   4/2011
CN   201945665 U   8/2011
(Continued)

OTHER PUBLICATIONS

International Search Report and International Preliminary Report on Patentability, dated Dec. 11, 2013 from parent International Application PCT/IB2013/053918. (in English).

*Primary Examiner* — Jermele M Hollington
(74) *Attorney, Agent, or Firm* — Nadya Reingand; Yan Hankin

(57) ABSTRACT

The invention relates to a testing device for testing a photovoltaic device having an electrical contact area, the testing device comprising: a support base for supporting the photovoltaic device, the support base having a support surface for receiving the photovoltaic device, a measurement device, at least one electrical wire for temporarily establishing an electrical contact between the measurement device and an electrical contact area of the photovoltaic device, the electrical wire is a flexible wire being electrically conductive and arranged to receive the photovoltaic device between the support surface and the flexible wire, at least a portion of the flexible wire abuttingly adapts along its longitudinal extension against the electrical contact area of the photovoltaic device when the photovoltaic device is received by the support surface.

18 Claims, 6 Drawing Sheets

(56) References Cited

U.S. PATENT DOCUMENTS

Figure 1:
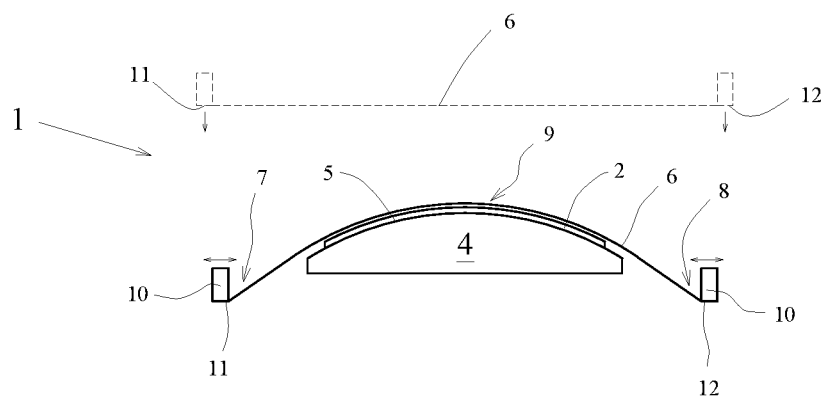

| | | |
|---|---|---|
| 2010/0045264 A1 | 2/2010 | Kiesewetter et al. |
| 2011/0012635 A1 | 1/2011 | Lu et al. |
| 2011/0140726 A1 | 6/2011 | Sullivan et al. |
| 2011/0147437 A1 | 6/2011 | Eusch et al. |
| 2013/0021051 A1 | 1/2013 | Richter |
| 2014/0232426 A1* | 8/2014 | Barabi ............... G01R 31/2865 324/750.25 |
| 2017/0149381 A1* | 5/2017 | Anaya .................... H02S 50/10 |
| 2018/0090633 A1* | 3/2018 | Cho ................... H01L 31/0465 |

FOREIGN PATENT DOCUMENTS

| | | | |
|---|---|---|---|
| DE | 102011081004 A1 | 2/2013 | |
| EP | 2549282 A1 | 1/2013 | |
| JP | 2010-177379 A | 12/2010 | |
| WO | WO 2007142515 A1 * | 12/2007 | ........... H01L 31/048 |
| WO | 2012/051695 A1 | 4/2012 | |
| WO | 2012/127411 A1 | 9/2012 | |
| WO | 2013/115046 A1 | 8/2013 | |

* cited by examiner

TESTING DEVICE

The invention relates to a testing device according to the preamble of claim 1 and to a method of testing a photovoltaic device with a testing device.

The present invention relates generally to testing photovoltaic device, and more particularly to systems and method for making at least a detachable electrical contact with at least a photovoltaic device for testing the photovoltaic device in a reliable, repeatable and cost effective, environmentally safe, and secure manner.

A solar cell is a (solid state) device that converts the energy of sunlight directly into electricity by the photovoltaic effect. Assemblies of solar cells are used to make solar modules, also known as solar panels. The energy generated from these solar modules, referred to as solar power, is an example of solar energy. Photovoltaics is the field of technology and research related to the practical application of photovoltaic cells in producing electricity from light, though it is often used specifically to refer to the generation of electricity from sunlight.

Photovoltaic cells also called solar cells normally are semiconductor devices which transform light in electrical power. Nowadays most of the commercially sold photovoltaic cells are crystalline solar cells, which consist of doped silicon wafers. In order to establish electrical contact with such cells contacts are provided, e.g. a metallization layer is applied on the backside and on the topside of these wafers. Usually the backside metallization covers the whole backside area whilst the topside metallization consists of very narrow fingers and two or more bus bars. Also cells without front and/or backside metallization are known.

In order to get higher power, solar cells are interconnected and assembled in solar modules. These solar modules consist of several cells, which are electrically connected in series. Normally the topside metallization of one cell is linked to backside metallization of the next cell, using metal ribbons also called tabs. These ribbons usually are soldered or otherwise bonded to the cells in order to minimize contact resistivity and to get a uniform electrical contact to the cell, nowadays mostly to the bus bar.

Usually, at the end of the cell production, and at the latest before the cells are assembled in solar modules, the solar cells are tested in order to determine their quality. The existing measurement technologies to evaluate different cell properties includes Electroluminescence imaging, shunts thermal imaging, and the IV-curve measurement, using a sun simulator wherein the cells have to be electrically connected with a measuring device.

Electroluminescence is an imaging technology which uses the inverse principle of a photovoltaic cell. The electroluminescence imaging setup may consist in an electrical contacting system for the cell and a camera system. The whole system has to be installed in a dark room in order to be able to measure only by the very low intensity of the electroluminescence radiation. Instead of transforming photons in electrons, a current is imposed in the cell and photons are created in the active areas of the cell. The active area is the entire cell surface wherein photons are generated. The photons just may not leave the cell directly as they may be reflected from the back contact and thus circumvent the fingers or bus bar. The emitted photons may be visualized by the use of highly sensitive digital cameras.

In IV-curve measurement techniques which is a functional indoor test of the cell, a light source (possibly with a sun-like spectrum), an electric contacting system and electronic measuring equipment may be used. The cell is connected to the measuring device and during the illumination of the cell, electrical measurements are made. A variable load may be active or passive, sweeps the whole range of device characteristics, for example, from short circuit to open circuit, in order to collect the current versus voltage curve of the cell.

In both Electroluminescence imaging, IV-curve measurements but also other techniques such as measurements for grid resistance etc., it is important to have an electric contact system which covers a minimum of the active area on the cell's top side wherein photons are created. An optimal electric contact system may thus be restricted on these inactive areas and cast only a minimum of shadows on the active area. One may also desire to use a contacting system that resembles the connectors that interconnect the cells in the module. In this way the cell efficiency in the module may be approximated.

Furthermore it is important for IV-curve measurements to have electrical contacting properties which are very similar to the use of soldered ribbons. Contact resistivity has to be very low (comparable to a solder joint) and the contact points may be equally distributed over the whole bus bar, so that the ohmic resistance of the bus bar is in parallel to that of the connector as it is the case with a soldered ribbon.

Generally, three main approaches, namely, spring probes, bent wires and supported wires, exist for electrical contacting of solar cells.

Spring probes (e.g. known from CN102023235 A, HR20120081 T1, JP2010177379 A) consist of needle pins, guided in a tube and preloaded by springs. For contacting the bus bar of the solar cell, an array of several spring probes are aligned over the bus bar and are fixed on a fixation bar. These designs require many delicate assembly steps. The needle pins are very delicate and are easily damaged. The cross section of the contact areas is also very small as compared to that of ribbons connected to the bus bar. Also the array of spring probes has to be repeated for each bus bar. In addition for bus bar less cells, the contact of the probes does not resemble the contact later in the cell, introducing an undefined error. When contacting fingers, it is notoriously hard to hit the fingers with the probes.

In case of bent wires approach, bent metallic wires are used. They are fixed outside the cell area in order to minimize the cast shadows on the solar cell. Precise alignment of the wire tips on the bus bar requires delicate assembly. Also the cross section of the contact is very small (and very different from the interconnecting in the solar module) and the number of contact point is limited by the complicated design.

Supported wires used as electrical contacting means (as e.g. known form CN201945665 U, DE102011081004 A1, US2007068567 A1) are fixedly connected along their entire length to a longitudinal support extending over the solar cell to be contacted. The longitudinal support carrying the wire (which is at least partially bare, with no insulation) forces the wire against the solar cell. The support has to be stiff and mechanically stable to exert this force. This leads to undesirable large and heavy supports casting much shade onto the solar cell.

US2010045264A1 discloses a probe for temporarily electrically contacting a solar cell for testing purposes having a plurality of contact elements with angled configuration and whose lower terminals (tips) to be laid on the electrode terminals of a solar cell for producing the electrical contact.

Accordingly, the present scenario is necessitating the need for a new system which is capable of overcoming disadvantages inherent in the conventional photovoltaic testing techniques by making a detachable electrical contact with at least a contact area of at least a photovoltaic device for testing the photovoltaic device such that the time for contacting and releasing the photovoltaic device may be minimal and shocks on the photovoltaic device may be prevented to avoid cracks, micro cracks or destruction of the surface of the cell. Also the new system should be cost effective, have high repeatability (contact resistance should be as constant as possible from one cell to the next) and closely mimic the interconnection technology that is used to interconnect the cells in the solar modules. Further, the parts touching the cell wear off and thus should be inexpensive and be readily replicable.

In view of the foregoing disadvantages inherent in the prior arts, the general purpose of the present invention is to provide an improved combination of convenience and utility, to include the advantages of the prior art, and to overcome the drawbacks inherent therein in a cost effective, environmentally safe, and secure manner.

In photovoltaic industry, cells are generally provided with bus bars, that are large enough electrodes to permit soldering of copper ribbons on them. Once on the cell they are sometimes called tabs. These bus bars are occupying/shading some area on the cells, so they will not allow light to go through them, therefore diminishing the photovoltaically generated current of said cell. Moreover, fingers are applied to the cell that are connected to the bus bars to guide the electrons to the bus bars.

Recently, some manufacturers are proposing bus-barless cells, with only fingers or even without fingers on the cell. In a final module, the current collection function (previously performed by the bus bars) is done by the multitude of fingers or by wires connecting each of the cells and extending as if they were fingers. A (transparent) conductive layer on the cell may help to collection of electrons. However, before the cells are assembled into a solar module, they have to be tested. Providing a temporary electrical connection to the fingers (typically 31 fingers are provided or more) of a cell or to a cell without electrodes at all is a challenging task.

In the latter case the contacting system must mimic the final interconnection of the cells, because the flow of the electrons strongly depends on the metal structures (ribbons or contacting means) attached to the cells.

In a production line, solar cells are manufactured at tackt times approaching or even surpassing one per second. If they are of bus-barless type, one needs to have a proper device to ensure reliable contacting of each finger with several rows of wires (possibly 2 to 5, ideally agreeing with the number of ribbons used later). Moreover, these two to five wires of the device need to contact the fingers. Newer technologies use numerous thin wires, as e.g. known from applicants Smart-Wire Technology.

This device and its contacts have to withstand several millions of contact sequences with good reliability. It should exert minimal stress on the cell because said cell is very fragile, especially with cell thickness going down from 200-140 µm to 100 µm (micrometer) in the future. The device or its contacts should have in addition a very low internal resistance because this resistance will add an error to the measurement. Further, contacting should have good repeatability, which is even more important because systematic errors can be corrected for.

The object of the invention is to overcome these problems and to provide a solution to reliably electrically contact a flat photovoltaic device, particularly (bus-barless) cells, wafers or any intermediate stage, with minimal mechanical stresses and good repeatable contact quality, in order to provide a reliable means to measure this type of cells. Photovoltaic devices have two contacts (+ and −) that may be distributed on opposite sides of the cell or on the same side or a combination thereof.

This object is achieved with a testing device according to claim 1. According to the invention the electrical contacting means comprises at least one flexible wire being electrically conductive and arranged as to receive the photovoltaic device between the support surface and the flexible wire, and that the testing device comprises forcing means for forcing at least a portion of the flexible wire to abuttingly adapt along its longitudinal extension against the electrical contact area of the photovoltaic device when the photovoltaic device is received by the support surface.

The flexible wire may have a bare, electrically conductive outer surface. The flexible wire may abuttingly adapt along its entire longitudinal extension or along at least a part of its longitudinal extension against the electrical contact area of the photovoltaic device when the photovoltaic device is received by the support surface.

The forcing means cooperates with the flexible wire in such a way, that the flexible wire adapts along its longitudinal extension to the flat surface contour of the photovoltaic device. During the contacting procedure the flexible wire snuggles or engages the electrical contact areas of the photovoltaic device. The flexibility of the wire provides a reliable electrical contact with electrical contact areas of the photovoltaic device along its longitudinal extension. The wire thereby abuttingly lies against the surface or the contact structures such as fingers or bus bars of the photovoltaic device. The electrical contact area may be any region on the surface of the cell that is used for contacting. In cells without any metal contacts it may e.g. be the region where the connectors or ribbons for interconnecting neighboring cells or leads are located in the final module. This functions especially well for cells with a transparent conducting layer such as an ITO layer.

With other words: the continuously extending face (or long side) of the wire lays on the flat surface of the photovoltaic device, thus touching the electrical contact areas, e.g. fingers. In the contacting position the flexible wire extends essentially parallel with the flat surface of the photovoltaic device.

Preferably, the wire does not only abut on the photovoltaic device but is pressed against it, to enhance the electrical contact. This allows to reduce the contact resistance and make the latter repeatable from one measurement to the next.

One of the main advantages of the invention is that the flexible wire due to its flexibility (or deformability) always hits the fingers lying below the wire, because the wire does not have any particular structure along its longitudinal extension. Deformability of contact area also helps here. The lack of structure also makes the contacting cost-effective. Moreover, normal round wire may be used. For special cases wire with different cross sections is an option as well, e.g. triangular or square. The flexible wires may be shaped like conventional ribbons or the connectors later used in the solar panels. The flexible wire may also have a non-conductive core and a conductive mantel. The core may e.g. be of Kevlar, while a metal wire is coiled around it, like a guitar string.

The testing device may have at least two states depending on the wire position. In a first position, the contacting position, the wire abuts against the photovoltaic device. In this position the flat photovoltaic device is received (or sandwiched) between the support surface and the flexible wire. In a second position, the release position, the wire is more spaced from the support surface than in the first position. This allows to place a (new) photoelectric device on the support surface without damaging the wire.

As flexible wire is understood a wire that is capable of adapting its run or form to the contour of the shape of the contact area of the photovoltaic device.

The flexible wire has a contacting section which in the contacting position of the wire abuts against the photovoltaic device. The flexible wire extends freely at least in its contacting section, which in the contacting position of the flexible wire abuts against the electrical contact area of the photovoltaic device. In the release position, the contacting section of the flexible wire is a freely extending section; in the contacting position the freely extending contacting section abuts against the photovoltaic device.

A photovoltaic device may be or comprise e.g. a wafer, a solar cell, a string or array of solar cells, a solar cell module or subassembly thereof or any combination thereof. Multiple interconnected cells may be contacted as a whole or only a subset thereof may be contacted. The term solar cell and solar module may refer to any technology including crystalline and thin film technologies and combinations thereof.

An electrical contact area of the photovoltaic device may contain e.g. a bus bar, a finger, an area of the photovoltaic device such as part of its active surface, a connector for interconnecting ribbons or any combination thereof. The electrical contact areas are arranged on the top and/or back surface of the photovoltaic device. A photovoltaic device usually comprises at least two different kinds of contact areas, one of them being related to the plus and one of them being related to the minus pole.

The inventive method allows both, performing electroluminescence and measuring of I/V-curves. But also other measurements can be done, where the cell should be electrically contacted at one or both sides, with one or multiple polarities and for current and/or voltage connections. The term "measurement device" as used in this description and claims may therefore be understood as measurement detector (e.g. voltmeter and/or ampere meter) and/or as measurement power supply (e.g. voltage source and/or current source). The testing device according to the invention may thus be used to apply and/or pick up current or voltage or both form the photovoltaic device (solar cell).

Preferably, the section of the flexible wire that abuttingly adapts against the surface of the photovoltaic device has a length of at least 2 cm, preferably at least 4 cm, more preferably at least 8 cm.

Preferably, the section of the flexible wire that abuttingly adapts against the surface of the photovoltaic device corresponds to the width or length of the photovoltaic device. Typical width/lengths are 125 mm (5 inch) and 150 mm (6 inch).

The wire may be selected from a list of materials comprising CuNi25Zn12, CuNi25Zn8, CuNi25Zn17, CuNi45, Copper, Nickel, Zinc, Magnesium, plastic with conductive material addition or any combination thereof. If plastic is used, it may be metalized afterwards.

Preferably, the E-Modulus of the flexible wire is smaller than 130 kN/mm2 (130 GPa), e.g. like copper or brass, allowing an efficient adaption of the flexible wire to the surface contour of the photovoltaic device. The wire may be flexible enough to bend under its own gravitational weight when held on one side, preferably even when the wire is shorter than half or even a quarter of the length of the contact it establishes with the photovoltaic device. The wire may be hardened, to optimize the lifetime. Preferably, only one side of the wire is hardened so that the wire stays flexible enough.

Preferably, the flexible wire continuously extends above the support surface over at least one edge of the support surface, preferably over two opposing edges.

Preferably, the flexible wire continuously extends above the support surface between opposed sides of the support surface. This allows to contact all electrical contact areas located between opposed sides of the photovoltaic device with only one flexible wire. In the contacting position, the flexible wire preferably runs in a straight manner between a first edge of the photovoltaic device and a second edge of the photovoltaic device, wherein preferably the second edge is opposed to the first edge.

The flexible wires may also run at an inclined angle (not equal to 0° or 90°) relative to the edges of the photovoltaic device.

Preferably, the testing device comprises at least one holding member holding the flexible wire. This allows an exact and reproducible positioning of the flexible wire with respect to the photovoltaic device being received by the support surface.

Preferably, the flexible wire extends between a first holding member holding the flexible wire at a first wire portion and a second holding member holding the flexible wire at a second wire portion, the first and second wire portions being distanced from each other, wherein preferably the holding members are bobbins. In such a way the run (or longitudinal extension) of the flexible wire between the first and second holding members is exactly defined. The electrical contact with the electrical contact areas of the photovoltaic device is established in a wire section extending between first and second holding means. It is not necessary, that the first and second wire portions constitute the ends of the wire. Other embodiments are possible according to which the same wire runs several times over the support surface or the photovoltaic device respectively.

The flexible wire extends freely at least in its contacting section between the first and second holding members (i.e. there is no additional holding member or support member connected to or supporting the contacting section of the flexible wire). This allows the wire to adapt its run to the contour of the surface of the photovoltaic device. With other words: In the release position the contacting section of the flexible wire freely hangs between first and second holding members; in the contacting position the freely extending contacting section abuts against the photovoltaic device.

In the case of bobbins, they may be connected to a spring so that when the wire is bent the bobbin is allowed to rotate (at least a little bit), thus controlling the wire tension. Depending on the application the elasticity of the wire may be enough to keep the tension in the desired range.

The wire(s) may be provided in a renewable manner (renewable wire): The wire(s) is/are disposed on bobbins and incrementally winded by a rotation of the bobbins in order to renew the wire and not let it wear too much, thus ensuring good, repeatable contact.

The wires may be mounted on a frame and the frame itself is slightly displaced from one measurement to another in the direction of the longitudinal wire extension in order to spread wearing all along the wire. The renewable wire may be clamped in one position during one or multiple measurement, to be released when being renewed.

Preferably, the flexible wire freely hangs (or extends) between the holding members in the release position.

The flexible wire is preferably tensioned. When not touching a cell or the support base, the tension in the wire is preferably higher than 30 N, preferably approximately 50 N.

Preferably, the normal force may be quite tiny, but is sufficient and highly depends on the distance between the contacting points, which can be influenced again either by the cell layout or the relative angle between the contact structures (fingers) and flexible wire(s). Preferably, the tension of the flexible wire(s) in the contacting position is in the region from equal to the tension of the flexible wire(s) in the release position to about 110% of the tension of the flexible wire(s) in the release position as preferably the bending of the flexible wire is small.

Preferably, the first and second holding members are arranged laterally on opposite sides of the support surface. This allows to move the holding members below the plane of the support surface causing the wire to tightly abut against the flat surface of the photovoltaic device, thus enhancing the electrical conductivity of the contact.

The holding member preferably does not overlap with the support surface. The term 'not overlapping' means that the holding member does not extend as to block light coming from a light source used for testing the photovoltaic device.

In one embodiment wires may form the support surface. When a photovoltaic device is received by the testing device these wires are arranged below the photovoltaic device. The wires forming the support surface may be adapted to lift the photovoltaic device against the flexible wires arranged above the photovoltaic device. I.e. these lower wires may e.g. press the cell against the flexible wires above the cell, thus establishing a contact with both poles of the cell.

Preferably, the first and second holding members are provided on a frame which is arranged above the support surface. A frame allows an exact and stable fixation of the wire or wires. Moreover, the frame acts as forcing means with an uniform movement.

In another embodiment the first and second holding members are provided on a frame which is arranged below the support surface (as was explained above).

Preferably, the forcing means comprises a drive mechanism for moving the holding member(s) relative towards the support surface or wherein the forcing means comprises at least two movable clamps arranged on opposite sides of the support surface for pressing the flexible wire against the support surface. The term 'relative movement' means that the holding members(s) may move towards the support surface and/or that the support surface may be moved towards the holding member(s). Additionally to the holding members, the clamps ensure a reliable and reproducible electrical contact and thus a defined electrical resistance.

According to an embodiment of the invention, the support surface is built by a number of wires or electrically conducting structures for contacting the photovoltaic device. Moreover, in this way, the pressure (force divided by contacting area) on the photovoltaic device is not reduced by a large support base. Here, moving the support base towards the flexible wires above the cell, makes it easy to position the photovoltaic device relative to a light source.

The holding member(s) may comprise movable clamps, preferably arranged on opposite sides of the support surface, for holding the flexible wire in a defined way.

Preferably, the testing device comprises tensioning means for tensioning the flexible wire. The tensioning means may act in a direction of the longitudinal extension of the wire and/or in any other direction. The first option ensures that the wire is held straight, but is allowed to adapt to the length and shape of the photovoltaic device and the second option ensures that the wire is pressed against the photovoltaic device. These options may be realized alternatively or in a combined manner.

So the tensioning means may be something that only pushes the wire towards the electrical contact areas on the flat surface of the photovoltaic device. The tensioner may also clamp the wire to ensure more defined mechanical and geometrical conditions.

The tension of each wire may be e.g. ensured by means of weights disposed on each wire end or wire portion, preferably outside the solar cell's top area. Alternatively, tension of each wire is ensured by means of additional springs disposed outside the solar cells top area such as on a frame holding the wire(s). It is preferred that the wire tension is controlled accurately. Preferably, each flexible wire has its own tensioning means so that the wire tension can be controlled individually per wire.

Preferably, the flexible wire extends in meandering shape at least two times above the support surface, wherein preferably the flexible wire is deflected by pulleys arranged laterally of the support surface. The advantages of this embodiment consists in the fact that only one wire is necessary to contact more than one (laterally adjacent) portions of the photovoltaic device. In this embodiment one wire may cross several times on top surface of the cell by means of pulleys.

The main idea of the following two embodiments is to use a (radius of) curvature to apply a constant pressure on a cell along the wire in order to perform multiple contacts on the cell fingers.

In one embodiment, the support surface is convex curved towards the flexible wire. One may e.g. use a slightly curved base or chuck on which the solar cell is abuttingly maintained by means of gravity or vacuum or simply by pressure exerted by the flexible wire in the contacting position. It is advantageous to use a set of parallel wires or parallel running wire sections on the top of the solar cell surface in such manner that the wires or wire sections will follow the cell's curvature. Due to the curved shape of the support surface, the wires will exert a continuous pressure on the solar cell and specifically on the fingers of that cell because the fingers will be slightly higher than the rest of the cell, ensuring good contact conditions of the flexible wire with the metal fingers. In such a contacting arrangement it is preferred that the fingers extend perpendicular or more or less perpendicular to the wires. Deviations up to 5 or even 10 degrees may be desirable as well. The deformability of the wires (and/or the photovoltaic device) helps to establish a good, repeatable contact with low contact resistance, even if the contact areas are nothing more than areas on the photovoltaic device.

Preferably, the curvature of the support base has a radius smaller than 5 meters, preferably about 3 meters.

In a second embodiment, the flexible wire has a preformed shape being convex curved towards the support surface. During contacting, the shape of the wire adapts from a curved to a parallel (or at least partially parallel) run with respect to the flat surface of the photovoltaic device. Preferably, the wire is elastic and returns to its initial shape after each contacting procedure. The wire may be made of conductive spring material and has an initial curvature. When applied onto the flat surface of the solar cell, the initial curvature is bent back to a straight line, resulting in force repartition all along the wire, so that a pressure will be exerted all along the cell, resulting in good contacts onto the electrical contact areas (e.g. fingers). Of course, the radius of curvature or more general the shape of the wire(s) should be chosen such that it exerts enough force onto the solar cell surface, but not too much to avoid damage of the cells such as breakage or cracks.

The inventive embodiments described above may also be defined as a testing device for contacting a flat photovoltaic device, such as a solar cell, wafer or any intermediate stage, wherein the photovoltaic device and/or the contacting flexible wire are bent when approaching and touch on each other.

Preferably, the testing device comprises a first flexible wire for contacting a first electrical contact of the photovoltaic device and a second flexible wire for electrically contacting a second electrical contact of the photovoltaic device. First and second electrical contact may be on opposite sides or on the same (back) side of the photovoltaic device (particularly solar cell). Also, the first wire may be used for measuring current, while the second wire may be used to measure voltage.

In an embodiment of the invention one or more first and second flexible wires or wire groups may be used. The first and second wire (groups) are not connected other than thru conductive structures of the photovoltaic device under test during testing.

Normally the support surface the photovoltaic device lays on is the contact for the back side of the cell. Alternatively, a second inventive contacting means may be placed on the back side of the photovoltaic device. It may be placed in grooves in the base. In this way, the contacting of the cells as later in the modules may be simulated more closely.

E.g. back contact cells or IBC cells (with both plus and minus of the cell accessible from the back) may be contacted by first and second inventive contacting means disposed on the back of the cell. The invention may also be used to contact thin film solar cells. Moreover, individual regions on a thin film solar panel may be contacted.

Preferably, an electrical contacting means of the testing device comprises an electrical conductor extending on the support surface, wherein preferably the electrical conductor is a wire extending in a groove of the support surface. In such a manner both, positive and negative contacts may be contacted by means of the force exerted by the forcing means forcing the flexible wire to the top surface of the photovoltaic device.

Preferably, the forcing means comprises at least one magnet, preferably an electromagnet, attracting the flexible wire towards the surface of the photovoltaic device, wherein preferably the magnet is arranged under the support surface or forms the support surface. This allows a cost-effective construction without mechanical holding means or at least without movable holding means. The magnet can be an electromagnet or a permanent magnet. In this embodiment the wires itself and/or the support base may comprise or be part of or be connected to an electromagnet or a permanent magnet that pulls the wire and the support base (chuck) towards each other with the photovoltaic device interposed. An electromagnet allows an easily controllable change from the contacting state to the releasing state and vice versa. The power source of the electromagnet may be capable of applying electrical power to the electromagnet by applying the power in a smooth manner, ramping up from little power to the desired amount of power, preferably without surpassing a defined slope. The slope induces a current in the cell that may damage it.

The magnet (e.g. in form of a magnetic member) may be part of the electrical contacting means or, when contacting the photovoltaic device placed on the same side of the photovoltaic device as the electrical contacting means.

Preferably, the flexible wire is a flat wire, particularly made of sheet metal. In a preferred embodiment the flexible wire may have exactly the same shape as the ribbon used to connect the cells in the assembled module. The wire(s) may also be made of spring wire. The contacting means, especially on the back side (support surface) may comprise wires, flat ribbons or sheet metal. Wire(s) may have a mainly round, oval, rectangle or square cross sections.

Preferably, the flexible wire is not supported over at least 50% of the width or length of the photovoltaic device, preferably over substantially the compete width or length of the photovoltaic device, wherein preferably the non-supported wire portion abuts on the photovoltaic device during the measurement.

Preferably, the flexible wire is held only outside of the sensitive area of the photovoltaic device. Forcing means do not extend above the photovoltaic device (i.e. do not overlap with the surface of the photovoltaic device) and thus cannot shade the photovoltaic device.

Preferably, the flexible wire (or contacting means above the photovoltaic device) has a diameter smaller than 1 mm, preferably smaller than 0.8 mm, even more preferred smaller than 0.4 mm.

The object of the invention is also achieved by a method of testing a flat photovoltaic device with a testing device, comprising the steps of:

placing a flat photovoltaic device on the support surface of the testing device such that the photovoltaic device is placed between the support surface and the flexible wire, forcing at least a portion of the flexible wire to snuggle along its longitudinal extension against the electrical contact area of the photovoltaic device, thereby establishing an electrical contact between the testing device and the electrical contact area of the photovoltaic device, performing a test measurement by applying a voltage or current to the photovoltaic device and/or by picking up voltage or current from the photovoltaic device.

When bringing the testing device from its release position into the contacting position (electrically contacting the photovoltaic device) the flexible wire(s) may be moved towards the support surface or the support surface may be moved towards the flexible wire(s) or both, support surface and flexible wire(s), may be moved towards each other as to deflect the flexible wire(s).

It is also possible to use the invention to contact backcontact cells, possibly such that have equally fingers and sometimes bus bars on their top surface. The electrons are guided to the back of the cell thru vias, like Metal Wrap Though (MWT) designs, avoiding the mechanical problem of performing contacts only on back-surface when testing needs to be done on the front side. Interdigitated Back Contact cells may also be contacted.

Note that the inventive device is used mainly for picking up the current from the photovoltaic device. For a voltage measurement one measuring point would be enough. When measuring current, the current has to be supported and no losses (heating up, contact resistance, etc.) should be created that would impair the accuracy of the measurement.

Due to the facility to introduce any number of electrodes, the invention provides ways to realize different interconnection schemes in order to match (simulate) as much as possible the working conditions of the solar cells finally assembled to a solar cell module.

As the flexible wires contact the photovoltaic device, the wire may make a relative movement parallel to the contact area as to rub over each other. In this way, the oxidation of both the wires and possible metallization on the photovoltaic device may be (partially) removed, thus leading to a better contacting.

Figure 2:
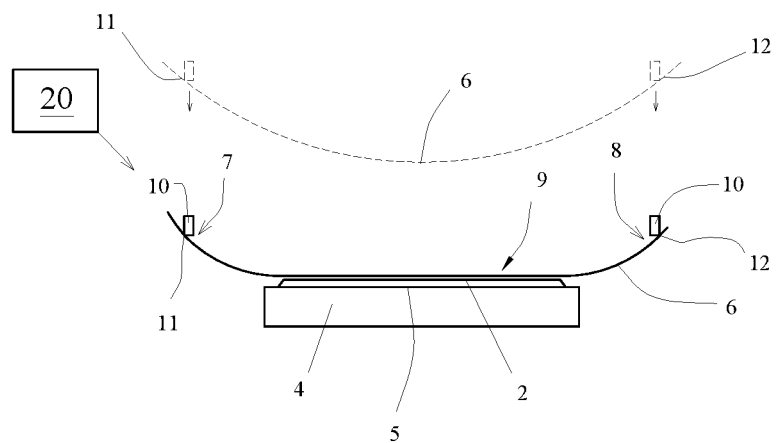
Figure 3:
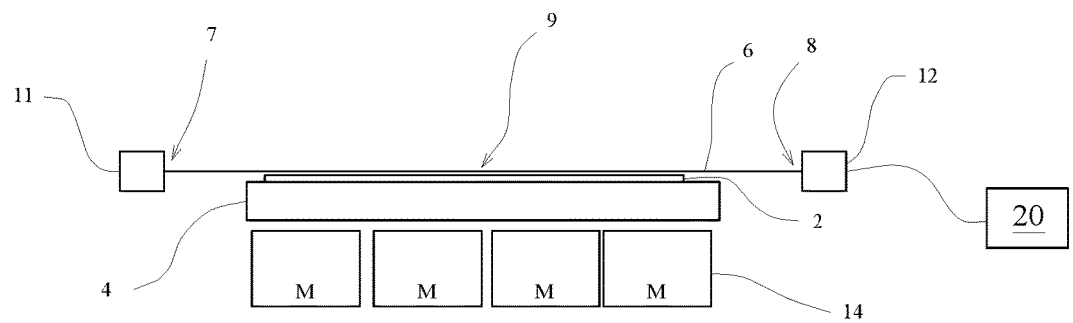
Figure 4:
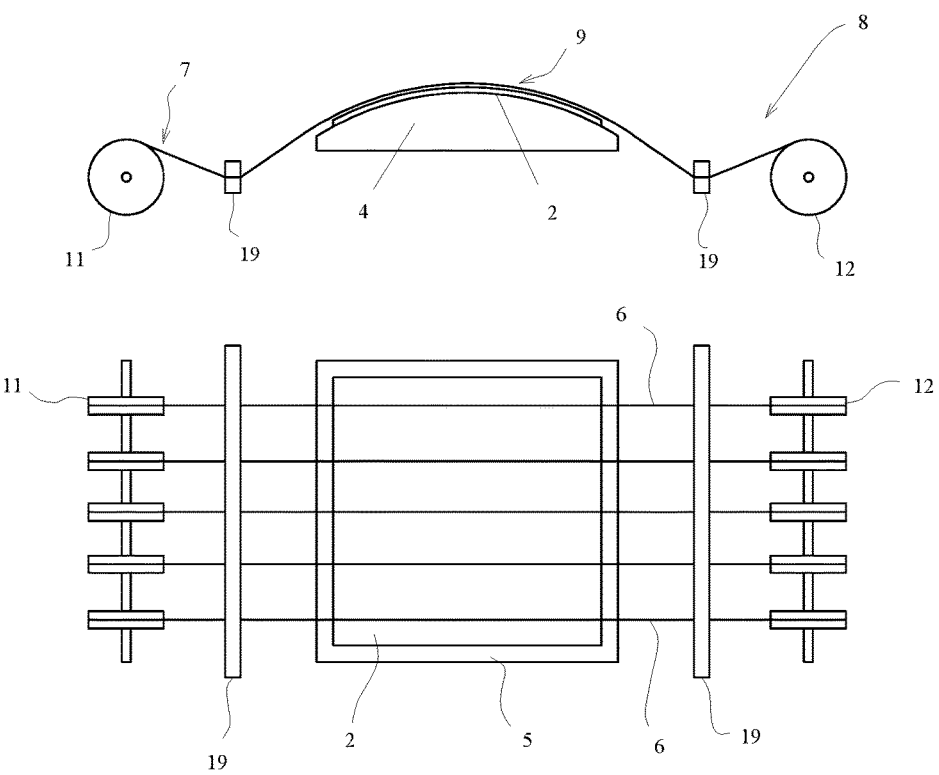
Figure 5:
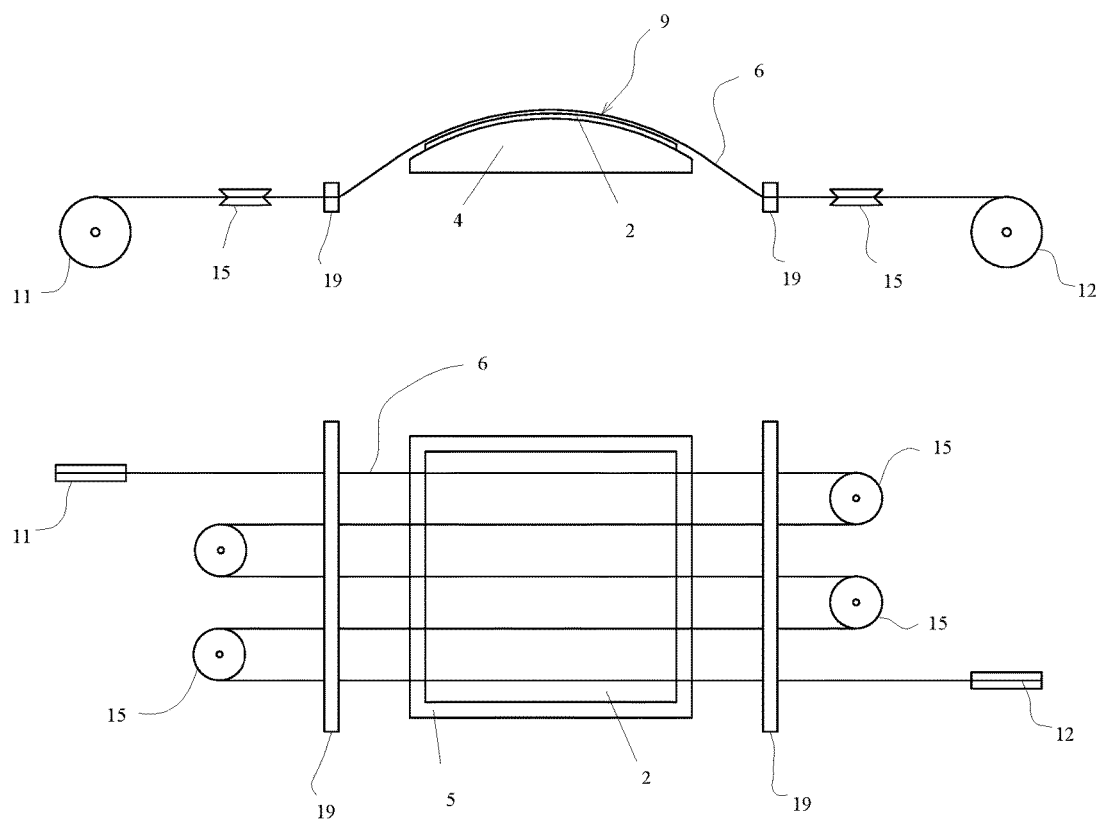
Figure 11:
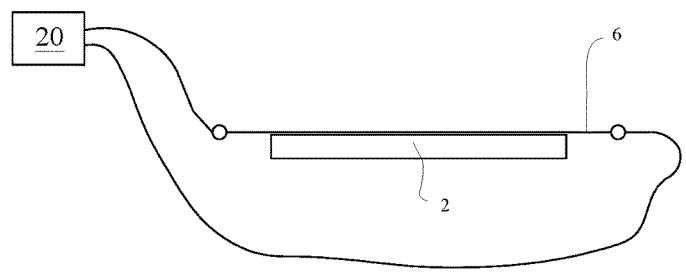
Figure 10:
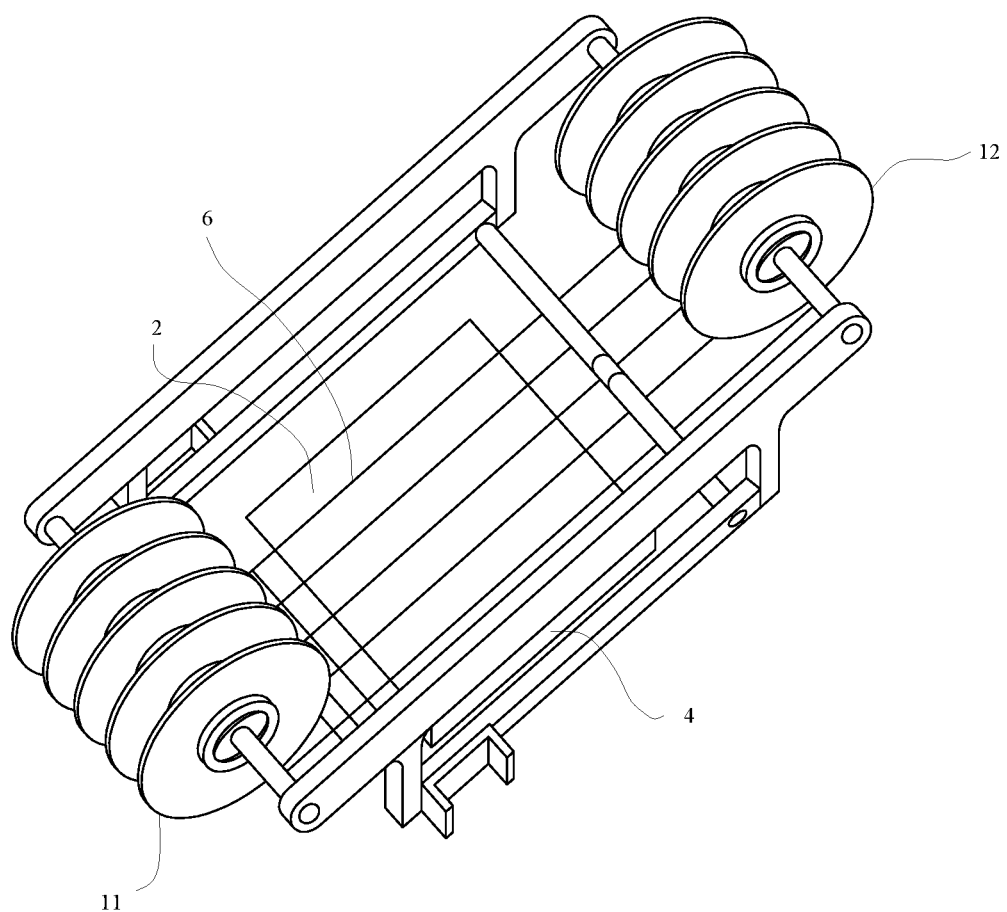
Figure 12:
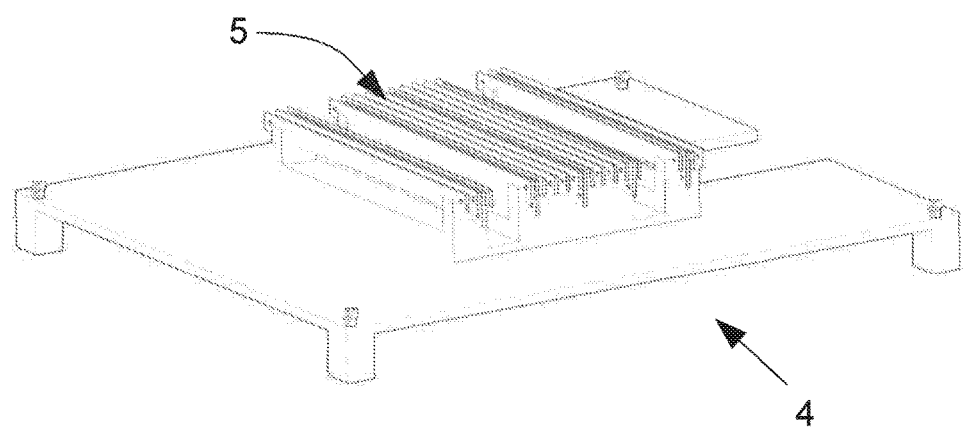

Further embodiments of the invention are indicated in the figures and in the dependent claims. The list of reference marks forms part of the disclosure. The invention will now be explained in detail by the drawings. In the drawings:

FIG. 1 shows a first embodiment of a testing device according to the invention,

FIG. 2 shows a second embodiment of a testing device with the flexible wire being convex curved towards the support surface, FIG. 3 shows an embodiment of a testing device with magnets as forcing means, FIG. 4 shows in a side view and a top view a further embodiment of a testing device with bobbins and clamps as holding and forcing means, FIG. 5 shows in a side view and a top view a further embodiment of a testing device with the flexible wire running several times over the support surface in a snake-like run, FIGS. 6 to 9 show different electrical contacting schemes, FIG. 10 shows a preferred embodiment in perspective view, FIG. 11 shows schematically the connection between a measuring device and a photovoltaic device via the flexible wire, and FIG. 12 shows an embodiment of the support base.

FIG. 1 shows a first embodiment of a testing device 1 for testing a flat photovoltaic device 2, particularly a solar cell, wafer or an intermediate stage thereof, having an electrical contact area 3 on its flat surface. In the contacting position the photovoltaic device 2 is received by a support surface 5 of a support base 4 and an electrical contacting means temporarily establishes an electrical contact between a measurement device 20 (schematically shown in FIG. 11) and the electrical contact area 3 of the photovoltaic device 2.

The electrical contacting means comprises at least one flexible wire 6 being electrically conductive and arranged as to receive the photovoltaic device 2 between the support surface 5 and the flexible wire 6. The flexible wire 6 has a contacting section 9 which in the contacting position of the wire 6 abuts against the photovoltaic device 2.

The testing device 1 of FIG. 1 further comprises forcing means in form of a (vertically) movable frame 10 for forcing the flexible wire 6 to abuttingly adapt along its longitudinal extension against the electrical contact area 3 of the photovoltaic device 2 in the contacting position. The forcing means may comprise a controllable drive mechanism for moving the holding members 11, 12 relative towards the support surface 5.

As can be seen from FIG. 1 the flexible wire 6 continuously extends above the support surface 5 between two opposing edges of the photovoltaic device 2 and thus contacts all electrical contact areas (e.g. fingers) along its extension.

The frame 10 has a first and a second holding member 11, 12 and the flexible wire 6 extends between the first holding member 11 holding the flexible wire 6 at a first wire portion 7 and a second holding member 12 holding the flexible wire 6 at a second wire portion 8, the first and second wire portions 7, 8 being distanced from each other, The first and second holding members 11, 12 are arranged laterally on opposite sides of the support surface 5. Both holding members 11, 12 are provided on a frame 10 which is arranged above the support surface 5.

The support surface 5 is convex curved towards the flexible wire 6 as to establish a constant pressure distribution of the wire 6 pressing against the photovoltaic device 2. The wire 6 runs in a straight manner and snuggles against the curvature of the flat surface of the photovoltaic device 2.

The dotted line indicates the position of the wire 6 in the release position. The double arrows indicate a lateral displacement of the holding members 11, 12.

Wires are attached to a frame 10. In order to avoid too much stress, the frame 10 itself may have some elasticity or a small lateral displacement should be possible. Minor differences between the wires could be absorbed by the elasticity of the wire itself or a resilient member on the frame 10.

When the frame 10 approaches the photovoltaic device 2, the wires 6 will first touch said photovoltaic device 2 on its centre, then it will progressively touch toward the edges. The right position is obtained when the wires 6 will leave the flat surface of the photovoltaic device 2 parallel to the end of the curvature for both sides of the photovoltaic device 2.

Too much bending of the wires 6 will result in additional stress on the edge of the photovoltaic device 2 resulting in possible breakage, while too less bending will result of the last fingers not kept in contact.

There are several parallel wires 6 attached to the frame 10 (as for example can be seen in FIGS. 6 to 9) in order to simulate more or less module assembling conditions. Also, one or more wires 6 may be insulated from the others in order to perform a separate voltage measurement according to 4-wires Kelvin scheme.

FIG. 2 shows a second embodiment of the testing device 1. Here, the flexible wire 6 has a pre-formed shape 5 being convex curved towards the support surface 5. The dotted line indicates the position of the wire 6 in the release position. When being pressed against the photovoltaic device 2 the wire 6 becomes aligned parallel with the flat surface of the photovoltaic device 2. The forcing means is built up by the movable frame 10 which is movable towards the support surface 5.

For some cell technologies it may be detrimental to the solar cells to bend them. Then the following method of FIG. 2 may be used. For that method, the wire 6 itself should have sufficient elastic resistance so it is necessary that its section is sufficient and usually larger than the one needed by the first method above. Also material has to have enough mechanical resistance combined by good electrical conductance.

Copper-beryllium alloys could be used for that purpose but other alloys like nickel-copper may be used as well. The wire has to be pre-formed with an initial radius of curvature, chosen to provide enough and properly distributed pressure on the cell when in final position and to stay within elastic domain of the material, so no fatigue occurs even after millions of contact sequences. Also the extremities of the wires have to be fixed on moveable or elastic frame pieces (not shown), so it can follow the degree of bending of said wires. The frame pieces should be even more complex, as they have to guide the wire in such a manner that it stays in the same plane above the surface of the cell. Like for the method of FIG. 1, the vertical movement has to be accurately controlled in order to obtain a flat shape for the wire 6 above the flat surface of the photovoltaic device 2. Too long stroke will result in excess strain on the edges of the cell while too short stroke will result in some fingers near the edges to remain not connected. The problem of local wearing-up of the wire exists as well. One way to overcome it could be to move slightly the frame on left-right direction between each contacting sequence, with a maximum movement corresponding to the pitch between fingers on the cell, in order to have a repartition of the wearing all along the wire. Of course, wires for current connection and some insulated wires for voltage measurement may be provided.

FIG. 4 shows an embodiment of a testing device with the holding means 11, 12 being bobbins. In the present embodiment two movable clamps 19 arranged on opposite sides of the support surface 5 press the flexible wire 6 in direction to the support surface 5 and thus against the photovoltaic device 2. The clamps 19 play the role of the forcing means.

In order to avoid wearing-up of the wires 6 always at the same place due to the presence of fingers on the photovoltaic device 2, one can install wires 6 on bobbins so it will be possible to move the wire 6 slightly from one contacting sequence to another and, by this method, proceed to a repartition of wearing-up all along the wire 6, as described on FIG. 4. Another mean may be to have only a limited number of wires 6 circulating all around the cell surface. FIG. 5 shows a such execution using only one wire.

FIG. 5 show a further embodiment of a testing device, wherein the flexible wire 6 extends in meandering shape several times above the support surface 5. In the lateral side regions beyond the support surface the flexible wire 6 is deflected by pulleys 15 which are supported laterally of the support surface 5.

FIGS. 6 to 9 present some of the possible interconnections schemes for measuring voltage and current. In Connection with these schemes the testing device 1 may have a first flexible wire for contacting a first electrical contact of the photovoltaic device and a second flexible wire for electrically contacting a second electrical contact of the photovoltaic device 2.

Figure 6:
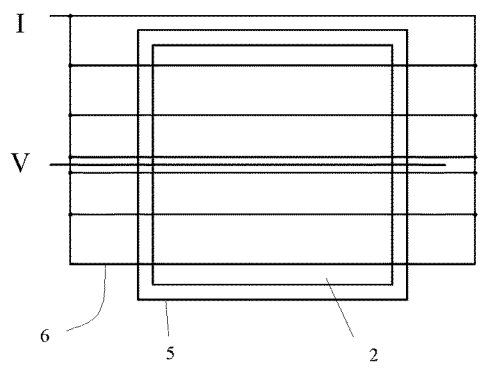
Figure 7:
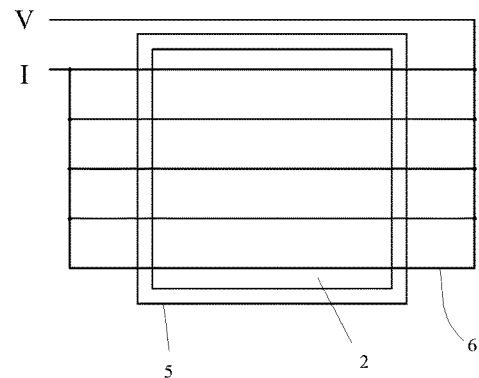
Figure 8:
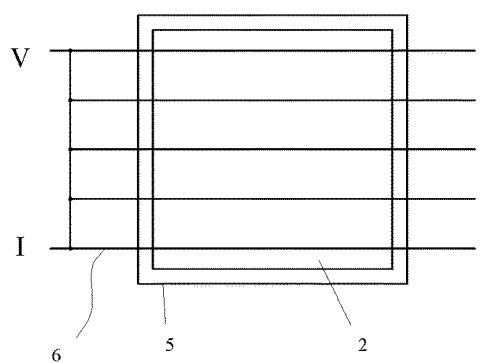
Figure 9:
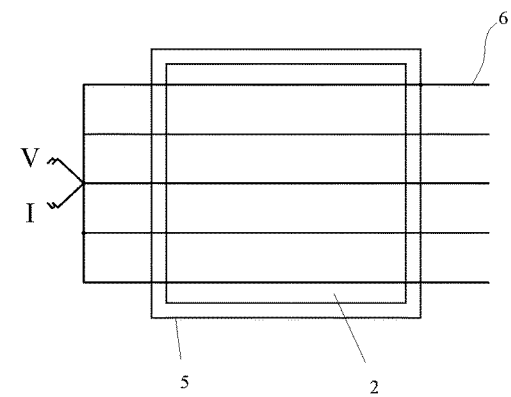

The schematics shown in FIG. 6 may be expended to multiple I and V wires. In one embodiment, e.g. 50 current and 5 voltage wires may be used. According to an embodiment of the invention it is also possible to use wires for voltage and current measurements alternately. Moreover, during one measurement, a wire is used for at least one voltage and one current measurement.

FIG. 11 shows schematically the measuring device 20 of the testing device 1 (which is omitted in the foregoing figures for clarity reasons) being electrically connected to the flexible wire 6 which abuts against the photovoltaic device 2. Different connection schemes are of course possible as e.g. shown in the FIGS. 6 to 9. In FIG. 11 a light source is indicated above the photovoltaic device 2 for illuminating the photovoltaic device for testing purposes.

FIG. 10 shows a further embodiment with bobbins as holding members 11, 12 in perspective view.

FIG. 3 shows a testing device, wherein the forcing means comprises at least one magnet 14, preferably an electromagnet, attracting the flexible wire 6 towards the surface of the photovoltaic device 2, wherein preferably the magnet 14 is arranged under the support surface 5.

Magnet(s) 14 may be placed under the support base 4 (or chuck) for attracting the flexible wire(s) 6 to the photovoltaic device 2. They may be electromagnets or permanent magnets. The holding members (e.g. on a frame) holding the wire 6 will be moved upwards when removing the photovoltaic device from its test position. The photovoltaic device 2 thus not feels and/or is forced when removing the wires 6. Since the wires 6 are basically not bent by the magnet (the photovoltaic device 2 is flat and the wires 6 extend in a more or less flat plain, the tension in the wires will not change much, when the wires lay on the photovoltaic device 2. Moreover, tensioning means for the wires 6 may be omitted.

If the wires 6 extend freely on one side, the wires may be "peeled off" by moving the holding members (e.g. on a frame) in a cured up direction and/or to the side, away from the photovoltaic device 2.

The inventive method of testing a flat photovoltaic device 2 with a testing device 1 comprises the steps of:

placing a flat photovoltaic device 2 on the support surface 5 of the testing device 1 such that the photovoltaic device 2 is placed between the support surface 5 and the flexible wire 6, forcing at least a portion of the flexible wire 6 to snuggle along its longitudinal extension against the electrical contact area 3 of the photovoltaic device 2, thereby establishing an electrical contact between the testing device 1 and the electrical contact area 3 of the photovoltaic device 2, performing a test measurement by applying a voltage or current to the photovoltaic device 1 and/or by picking up voltage or current from the photovoltaic device 1.

As can be seen from the FIGS. 1, 2, 4 and 5 the longitudinal axis of flexible wire 6 is deflectable in a direction perpendicular to the support base 4 or support surface 5, respectively. I.e. in order to abuttingly adapt along its longitudinal extension against the electrical contact area 3 of the photovoltaic device 2 flexible wire 6 is flexible/deformable in a direction perpendicular to the plane of the support surface 5 (i.e. may change its run in this direction).

Preferably, the photovoltaic device is brought into a curved state (e.g. by means of a curved support surface). This guarantees a reliable electrical contacting also in the case the metallization (e.g. fingers) of the electrical contact area are slightly irregular in their height. The curvature also allows to apply a more uniform force to all electrical contact structures in the electrical contact area.

In an embodiment wires may be embedded in the support base (e.g. in a plastic material) to contact the photovoltaic device from below. An alternate embodiment is shown in FIG. 12. The support surface 5 is formed by electrically conductive bars (having the shape of knifes). These bars have on its top a curved contour to bring the photovoltaic device in a curved state (similar to the embodiment of FIGS. 1, 4 and 5). The flexible wires above the photovoltaic device (not shown in FIG. 12) are preferably in alignment with the bars of the support base (i.e. extend parallel and exactly above each bar), such that the force of the flexible wires acts only against the bars thus guaranteeing a good electrical contact.

Preferably, the tension in a flexible wire is approximately 50 N/wire. The total force on the cell distributed over its surface is expected to be around the same range. The invention is not restricted to the embodiments described above. The testing device may comprise tensioning means for tensioning the flexible wire along its longitudinal extension or perpendicularly thereto.

The testing device may comprise an electrical contacting means with an electrical conductor extending on the support surface, wherein preferably the electrical conductor is a wire extending in a groove of the support surface.

LIST OF REFERENCE SIGNS

1—testing device
2—photovoltaic device
3—electrical contact area
4—support base
5—support surface
6—flexible wire
7—first wire portion 8—second wire portion
9—contacting section of the flexible wire 6
10—frame
11—first holding member
12—second holding member
13—holding member
14—magnet
15—pulley
19—clamp
20—measuring device
I—current source or ampere-meter
V—voltage source or voltmeter

What is claimed is:

1. A testing device for testing a photovoltaic device, particularly a solar cell, having an electrical contact area on its flat surface, the testing device comprising:
   a support base for supporting the photovoltaic device, the support base having a support surface for receiving the photovoltaic device,
   a measurement device,
   at least one electrical contacting means for temporarily establishing an electrical contact between the measurement device and the electrical contact area of the photovoltaic device,
   wherein the electrical contacting means comprises at least one flexible wire being electrically conductive and arranged as to receive the photovoltaic device between the support surface and itself, and
   forcing means for forcing at least a portion of the flexible wire to abuttingly adapt along its longitudinal extension against the electrical contact area of the photovoltaic device when the photovoltaic device is received by the support surface,
   wherein the photovoltaic device becomes curved when received between the support surface and the flexible wire, wherein the flexible wire adapts its form to the contour of the shape of the contact area of the photovoltaic device and wherein the flexible wire extends continuously at least in its contacting section, which in the contacting position of the flexible wire abuts against the electrical contact area of the photovoltaic device,
   wherein the photovoltaic device essentially returns to its original state after testing.

2. The testing device according to claim 1, wherein the flexible wire further extends above the support surface over at least one edge of the support surface.

3. The testing device according to claim 1, wherein the flexible wire is held between at least a first holding member and second holding member.

4. The testing device according to claim 3, wherein the holding members are bobbins.

5. The testing device according to claim 4, wherein the first and second holding members are arranged laterally on opposite sides of the support surface.

6. The testing device according to claim 4, wherein the first and second holding members are provided on a frame, said frame being arranged above the support base.

7. The testing device according to claim 3, wherein the forcing means comprises a drive mechanism for moving at least one holding member relative to the support surface.

8. The testing device according to claim 1, wherein the testing device further comprises tensioning means for tensioning the flexible wire.

9. The testing device according to claim 1, wherein the flexible wire extends in a meandering shape at least two times above the support surface.

10. The testing device according to claim 1, wherein the support surface is convex curved towards the flexible wire.

11. The testing device according to claim 1, wherein the flexible wire is convex curved towards the support surface.

12. The testing device according to claim 1, wherein the testing device comprises a first flexible wire for contacting a first electrical contact area of the photovoltaic device and a second flexible wire for electrically contacting a second electrical contact area of the photovoltaic device, wherein the first flexible wire and the second flexible wire are not electrically connected with each other.

13. The testing device according to claim 1, wherein the forcing means comprises at least one magnet, the magnet attracting the flexible wire towards the surface of the photovoltaic device, the magnet being under the support surface.

14. The testing device according to claim 1, wherein the flexible wire has a diameter smaller than 1 mm.

15. The device of claim 1, wherein the wire has a tension between 30 N and 50 N.

16. The device of claim 1, wherein the support surface has a curvature radius of less than 5 meters.

17. The device of claim 1, wherein the support surface has a curvature radius of 3 meters.

18. A method for testing a photovoltaic device with a testing device according to claim 1, comprising the steps of:
   placing a photovoltaic device on the support surface of the testing device such that the photovoltaic device is placed between the support surface and the flexible wire, wherein the photovoltaic device becomes curved when received between the support surface and the flexible wire,
   forcing at least a portion of the flexible wire to snuggle along its longitudinal extension the electrical contact area of the photovoltaic device, thereby establishing an electrical contact between the testing device and the electrical contact area of the photovoltaic device, and
   performing a test measurement by applying a voltage or current to the photovoltaic device and/or measuring the voltage or current from the photovoltaic device,
   wherein the photovoltaic device essentially returns to its original state after testing.

* * * * *